United States Patent [19]

Kawashima et al.

[11] Patent Number: 6,090,482
[45] Date of Patent: Jul. 18, 2000

[54] SILICONE ADHESIVE FILM

[75] Inventors: Takanori Kawashima; Masayuki Fukuda; Toshifumi Ishikawa; Hiroshi Tomita, all of Sagamihara, Japan

[73] Assignee: Teijin Limited, Osaka, Japan

[21] Appl. No.: 08/870,239

[22] Filed: Jun. 5, 1997

[30] Foreign Application Priority Data

Jun. 5, 1996 [JP] Japan .................................... 8-142679

[51] Int. Cl.[7] ....................................................... C09J 7/02
[52] U.S. Cl. ..................... 428/353; 428/355 R; 428/447; 428/448
[58] Field of Search ..................... 428/343, 345, 428/352, 353, 355 R, 447, 448; 427/207.1

[56] References Cited

U.S. PATENT DOCUMENTS

| | | | |
|---|---|---|---|
| 4,026,826 | 5/1977 | Yoshida et al. | 528/12 |
| 4,029,842 | 6/1977 | Yoshida et al. | 428/334 |
| 4,806,422 | 2/1989 | Ohmo et al. | 428/336 |
| 5,520,767 | 5/1996 | Larson | 156/307.5 |
| 5,674,941 | 10/1997 | Cho et al. | 525/102 |
| 5,789,080 | 8/1998 | Grimberg et al. | 428/379 |
| 5,833,798 | 11/1998 | Leempoel | 156/329 |

FOREIGN PATENT DOCUMENTS

| | | |
|---|---|---|
| 0 346 768 | 12/1989 | European Pat. Off. . |
| 0 359 017 | 3/1990 | European Pat. Off. . |
| 64-5838 | 1/1989 | Japan . |
| 94/13468 | 6/1994 | WIPO . |

OTHER PUBLICATIONS

H. Sumita, "Release Agents", Chemical Abstracts, vol. 88, No. 16, (1978), Columbus, Ohio, US; Abstract No. 106922, XP00207482, & JP 52 123 394 A (Toshiba Silcone Co).

Database WPI, Section CH, Week 9336, Derwent Publications Ltd., London, GB; Class A94, AN 93–285162 XP002074843 & JP 05 200 959 A (Teijin Ltd).

Databae WPI, Section CH, Week 9336, Derwent Publications Ltd., London, GB; Class A17, AN 93–285494 XP002074844 & JP 05 202 214 A (Teijin Ltd).

*Primary Examiner*—Jenna Davis
*Attorney, Agent, or Firm*—Foley & Lardner

[57] ABSTRACT

A silicone adhesive film comprising (A) a biaxially oriented aromatic polyester film, and (B) a crosslinked primer layer which is present on at least one surface of the aromatic polyester film and is formed of a crosslinked polymer of (a) alkoxysilane having a functional group selected from the group consisting of an epoxy group, vinyl group and mercaptoalkyl group and (b) alkoxysilane having an amino group; a production method thereof; and a release film.

2 Claims, No Drawings

SILICONE ADHESIVE FILM

This invention relates to a silicone adhesive film, a production method thereof and a release film.

A release film is used as an adhesion surface-protecting film for a cohesive, adhesive, pasting medicine or the like or as a carrier sheet for forming a sheet of a curable resin such as an urethane resin, epoxy resin or unsaturated polyester resin or a sheet of a thermoplastic resin, and its use is expanding.

As the release film has been conventionally used a polyester film having on at least one surface thereof a silicon coating film formed from a cured addition polymerization product of a silicone compound having a vinylcyclohexane group, a cured polycondensation product of alkyloxysilane or an oxysilane compound, or the like. Although the silicone coating film is non-viscous and excellent in releasing effect and heat stability, it is hard to say that it is satisfactory in adhesion to a polyester film as a base film, and hence, a problem lies in that its durability is low.

To cope with this problem, a method for forming a crosslinked primer layer of a silane coupling agent (JP-A 1-5838 (the term "JP-A" as used herein means an "unexamined published Japanese patent application") is proposed to improve adhesion between the silicone coating film and a polyester film. However, this method has such problems as a low reactivity of the silane coupling agent and low productivity. To improve this reactivity, a platinum-based catalyst is added to an organic solvent system. However, this catalyst has a defect in that it is hardly soluble in water and it loses catalytic activity even when it is dissolved in water. Hence, it is not suitable for use in an aqueous coating solution.

To improve adhesion between a silicone layer and a polyester film, there is also proposed a method in which a silicone modified urethane or acrylic resin is used as a release layer. However, this method has an essential defect that the release layer is inferior in releasability.

It is therefore an object of the present invention to provide a silicone adhesive film which exhibits excellent adhesion to silicone.

It is another object of the present invention to provide a method of producing the above silicone adhesive film of the present invention industrially advantageously and at a high output.

It is still another object of the present invention to provide a release film which uses the silicone adhesive film of the present invention.

Other objects and advantages of the present invention will become apparent from the following description.

According to the present invention, the above objects and advantages of the present invention can be firstly attained by a silicone adhesive film which comprises:

(A) a biaxially oriented aromatic polyester film; and
(B) a crosslinked primer layer which is present on at least one surface of the aromatic polyester film and is formed from a crosslinked polymer of alkoxysilane having a functional group selected from the group consisting of an epoxy group, vinyl group and mercaptoalkyl group and alkoxysilane having an amino group.

In the present invention, as the aromatic polyester is preferably used a polyester comprising an aromatic dibasic acid as a main acid component and an aliphatic diol having 2 to 10 carbon atoms as a main diol component. The aromatic dibasic acid is used in a proportion of at least 50 mol %, preferably at least 75 mol %, more preferably at least 90 mol %, particularly preferably at least 95 mol %, based on the total of all the acid components. The aliphatic diol having 2 to 10 carbon atoms is used in a proportion of at least 50 mol %, preferably at least 75 mol %, more preferably at least 90 mol %, particularly preferably 95 mol %, based on the total of all the diol components.

The aromatic dicarboxylic acid is preferably terephthalic acid, isophthalic acid, 2,6-naphthalene dicarboxylic acid or the like. The aliphatic diol having 2 to 10 carbon atoms is preferably ethylene glycol, propylene glycol, trimethylene glycol, tetramethylene glycol, hexamethylene glycol, decamethylene glycol, cyclohexylene dimethanol, or the like.

The aromatic polyester is preferably a crystalline linear saturated polyester such as polyethylene terephthalate, polypropylene terephthalate, polytetramethylene terephthalate, polyethylene-2,6-naphthalene dicarboxylate, poly(1,4-cyclohexylenedimethyleneterephthalate), or the like.

The aromatic polyester may contain an aliphatic dicarboxylic acid component, for example, as a minor acid component other than the main acid component and poly($C_{2-4}$ alkylene glycol), for example, as a minor diol component other than the main diol component.

The aromatic polyester may be used as a blend with another resin as required.

The aromatic polyester preferably has an intrinsic viscosity, measured in orthochlorophenol at 35° C., of 0.6 to 0.75 dl/g, more preferably 0.05 to 0.75 dl/g.

The biaxially oriented aromatic polyester film of the present invention can be produced by any of conventionally known methods. For example, it can be produced by the steps of drying the above polyester, melt-extruding it over a cooling drum from a die (such as a T die or I die) to cool so as to give an unstretched film, stretching the unstretched film biaxially, and further heat-setting the biaxially oriented film. The thickness of the film is not particularly limited, but is preferably 12 to 250 µm. Although a polyester film containing no lubricant is preferred from a viewpoint of surface flatness, it may contain a lubricant for controlling surface roughness, such as inorganic fine particles exemplified by calcium carbonate, kaolin, silica or titanium oxide and/or fine particles precipitated from a residual catalyst. The lubricant is preferably fine particles having an average particle diameter of 10 to 100 nm and preferably contained in a polyester in a proportion of 1 to 15% by weight.

In addition to the above lubricant, the film can contain other additives such as an antistatic agent exemplified by dodecylbenzene sulfonic acid soda, color tone control agent and the like.

In the present invention, a crosslinked primer layer composed of a crosslinked polymer of (a) alkoxysilane having an epoxy group or the like and (b) alkoxysilane having an amino group is present on at least one surface of the biaxially oriented aromatic polyester film.

The alkoxysilane (a) having an epoxy group or the like is preferably represented by the following formula (I):

$$XSiZ_3 \qquad (I)$$

wherein X is an alkyl group having an epoxy group which may be interrupted by oxygen, a vinyl group or a mercaptoalkyl group and Z's may be the same or different and are selected from an alkoxyl group and an alkyl group, provided that at least two Z's are an alkoxyl group.

The alkyl group having an epoxy group which may be interrupted by oxygen is selected from glycidyloxypropyl, glycidyloxymethyl, glycidyloxyethyl and the like. The mercaptoalkyl group is selected from mercaptopropyl, mercaptomethyl, mercaptoethyl and the like.

Preferred examples of the alkoxysilane represented by the above formula (I) include γ-glycidoxypropyltrimethoxysilane, γ-glycidoxypropylmethyldiethoxysilane, vinyltriethoxysilane, vinyltrimethoxysilane, γ-mercaptopropyltrimethoxysilane and the like.

The alkoxysilane having an amino group (b) is preferably represented by the following formula (II):

$$YSiZ_3 \qquad (II)$$

wherein Y is an aminoalkyl group and Z is the same as defined in the above formula (I).

Illustrative examples of the alkoxysilane having an amino group (b) include N-β(aminoethyl)-γ-aminopropyltrimethoxysilane, N-β(aminoethyl)-γ-aminopropylmethyldimethoxysilane and the like.

The alkoxysilane having an epoxy group or the like (a) and the alkoxysilane having an amino group (b) (sometimes both together may be referred to as "silane coupling agent" hereinafter) are preferably a compound having water-solubility or water-dispersibility.

The alkoxysilane having an epoxy group or the like (a) and the alkoxysilane having an amino group (b) are preferably used in a weight ratio which satisfies the following expression (1).

$$99.9/0.1 \leq a/b \leq 80/20 \qquad (1)$$

In the above expression (1), a and b indicate, respectively, parts by weight of the alkoxysilane having an epoxy group or the like and parts by weight of the alkoxysilane having an amino group, based on 100 parts by weight of the total of the alkoxysilane having an epoxy group or the like and the alkoxysilane having an amino group.

The silicone adhesive film of the present invention may preferably contain basic inorganic particles in the crosslinked primer layer.

Preferred examples of the basic inorganic particles include iron oxide sol, alumina sol, tin oxide sol, zirconium oxide sol, silica sol and the like. Of these, alumina sol and silica sol are preferred, and silica sol having an effect of promoting the initial reactivity (dimerization, trimerization or the like) of a silane coupling agent is particularly preferred.

The basic inorganic particles preferably have a small particle diameter with a large surface area, that is, an average particle diameter of 1 to 150 nm, more preferably 2 to 100 nm, particularly preferably 3 to 50 nm. If the average particle diameter is more than 150 nm, the surface area will be too small, whereby the effect of promoting the reaction of a silane coupling agent may deteriorate and the surface of the crosslinked primer layer may become rough disadvantageously. On the other hand, if the average particle diameter is less than 1 nm, the surface area will be too large, whereby the control of the reactivity of the silane coupling agent may become difficult disadvantageously.

The amount of the basic inorganic particles is preferably 1 to 50% by weight, particularly preferably 2 to 20% by weight, based on the amount of the silane coupling agent. If the amount is less than 1% by weight, the crosslinking reaction of the silane coupling agent will be difficult to proceed, while if the amount is more than 50% by weight, a coating solution will lack its stability in forming the crosslinked primer layer, with the result that a precipitate may be undesirably produced in the coating solution in a short period of time after the addition of inorganic fine particles.

According to the present invention, there is also provided the following method of producing the above silicone adhesive film of the present invention. (i) A method of producing a silicone adhesive film comprising the steps of:

(1) forming on at least one surface of a biaxially oriented aromatic polyester film a coating film containing alkoxysilane having a functional group selected from the group consisting of an epoxy group, vinyl group and mercaptoalkyl group and alkoxysilane having an amino group, and then, (2) drying and heat-crosslinking the coating film to form a primer layer composed of a crosslinked polymer.

The coating film formed in the step (1) is obtained by applying a coating solution containing the above silane coupling agent and preferably further basic inorganic particles to at least one surface of the biaxially oriented aromatic polyester film.

The pH value of a coating solution, particularly an aqueous coating solution, containing a silane coupling agent and preferably further basic inorganic fine particles is adjusted to 4.0 to 7.0, preferably 5.0 to 6.7. If the pH value is less than 4.0, the catalytic activity of the inorganic fine particles will be lost, while if the pH is more than 7.0, the coating solution will become unstable, whereby a precipitate may be produced disadvantageously. An acid for adjusting the pH value is an inorganic acid such as hydrochloric acid, nitric acid or sulfuric acid, or an organic acid such as oxalic acid, formic acid, citric acid or acetic acid, and of these, an organic acid is most preferred.

The coating solution, particularly the aqueous solution, may be blended with a required amount of a surfactant such as an anionic surfactant, cationic surfactant or nonionic surfactant. It is preferred to use a surfactant which can reduce the surface tension of the coating solution to not more than 50 dyne/cm, preferably not more than 40 dyne/cm and promote wetting to a polyester film. Illustrative examples of the surfactant include polyoxyethylene alkylphenyl ether, polyoxyethylene-fatty acid ester sorbitan fatty acid ester, glycerine fatty acid ester, fatty acid metal soap, alkyl sulfate, alkyl sulfonate, alkylsulfosuccinate, quaternary ammonium chloride salt, alkyl amine hydrochloric acid and the like. Further, other additives such as an antistatic agent, ultraviolet absorber, pigment, organic filler, lubricant, anti-blocking agent and the like can be mixed in a range that does not impair the effect of the present invention.

The solids content of the coating solution is preferably not more than 30% by weight, particularly preferably not more than 10% by weight. The amount of the coating solution to be coated is preferably 0.5 to 20 g, particularly preferably 1 to 10 g, per 1 $m^2$ of the film.

Any conventional coating method can be employed to apply the coating solution, such as a kiss-roll coating, die coating, reverse coating, offset gravure coating, Meyer bar coating, gravure coating, roll brushing, spray coating, air knife coating, impregnation and curtain coating. They may be employed alone or in combination.

In the subsequent step (2) of the method of the present invention, a primer layer composed of a crosslinked polymer is formed by drying and heat-crosslinking a coating film formed on at least one surface of the biaxially oriented aromatic polyester film in the step (1).

The step of drying and heat-crosslinking the biaxially oriented aromatic polyester film having the above coating film is generally carried out at a temperature of 180 to 230° C. for 10 seconds to 5 minutes.

Although the coating can be carried out in the step of coating a primer, that is, the step of coating a polyester film which has been biaxially oriented and heat-set, separately from the production step of the film, it is desirable that the coating be carried out in a clean atmosphere because dust and dirt are apt to be included and from this point of view, the coating be carried out in the process of producing a polyester film. Particularly preferably, an aqueous coating solution is applied to one surface or both surfaces of a polyester film before termination of crystal orientation in an in-line coating step of the production process.

In this respect, the polyester film before termination of crystal orientation is an unstretched film obtained by thermally melting a polyester; a stretched film obtained by stretching an unstretched film in a longitudinal direction (lengthwise direction) or a transverse direction (width direction); a biaxially oriented film obtained by stretching a film in both longitudinal and transverse directions at a low stretch ratio (i.e., a biaxially oriented film before it is further re-stretched in a longitudinal or transverse direction to terminate crystal orientation); and the like.

In other words, according to the present invention, there is further provided the following method of producing the silicone adhesive aromatic polyester film of the present invention.

A method of producing a silicone adhesive film comprising the steps of:

(1) forming on at least one surface of an unoriented or insufficiently oriented aromatic polyester film a coating film containing alkoxysilane having a functional group selected from the group consisting of an epoxy group, vinyl group and mercaptoalkyl group and alkoxysilane having an amino group, and (2) sufficiently orienting the aromatic polyester film having the coating film, drying and heat-crosslinking the coating film during orientation to form a primer layer composed of a crosslinked polymer.

The polyester film having a coating film before termination of crystal orientation is introduced into the step (2) of drying, stretching and heat-setting. For example, a polyester film which has been coated with an aqueous solution and monoaxially stretched in a longitudinal direction is supplied to a stenter to be stretched in a transverse direction and heat-set. During this processing, the coating solution is dried and heat-crosslinked.

The crystal orientation conditions of the polyester film, such as stretching and heat-setting conditions, may be ones accumulated by those skilled in the art.

The thus obtained crosslinked primer layer of the silicone adhesive film of the present invention exhibits excellent adhesion to both a polyester film and silicone. Therefore, when the silicone adhesive film of the present invention is used, for example, to form a silicone release layer on a crosslinked primer layer, a release film having excellent durability can be obtained.

Therefore, according to the present invention, there is further provided a release film comprising:

(A) a biaxially oriented aromatic polyester film, (B) a crosslinked primer layer present on at least one surface of the aromatic polyester film and composed of a crosslinked polymer of alkoxysilane having a functional group selected from the group consisting of an epoxy group, vinyl group and mercaptoalkyl group and alkoxysilane having an amino group, and (C) a silicone release layer present on the crosslinked primer layer.

The silicone release layer is preferably a cured coating film obtained by subjecting polyorganosiloxane having an unsaturated hydrocarbon group such as a vinyl group and polyorganosiloxane having a hydrogen atom directly bonded to a silicon atom to an addition reaction in the presence of a platinum compound as a catalyst, a cured film obtained by subjecting polyorganosiloxane having a hydroxyl group bonded to a silicon atom and organosilane having a hydrolyzable group (such as alkoxy group, oxime group, acetoxy group or the like) or polysiloxane to a condensation reaction in the presence of an organic tin or organic titanium compound as a catalyst, and the like.

The cured film is formed by applying a coating solution for the formation of the film to a primer layer and curing the solution on the primer layer. Silicone for the formation of the film is dissolved in a solvent such as toluene, ethyl acetate, n-hexane, methyl ethyl ketone, cyclohexanone or the like to prepare a coating solution. It is preferred to add a trace amount of a catalyst such as an organic platinum compound to this coating solution for the promotion of a polymerization reaction. Spinner coating, spray coating, bar coating, gravure coating, reverse coating or the like may be used to apply this coating solution.

The thickness of the silicone release layer is preferably 0.01 to 10 $\mu$m, more preferably 0.02 to 5 $\mu$m, in a dry state. If the thickness is smaller than 0.01 $\mu$m, releasability will be insufficient and if the thickness is larger than 10 $\mu$m, silicone will be transferred to a pressure-sensitive adhesive easily due to insufficient polymerization.

The thus obtained release layer is excellent in adhesion to a polyester film through a primer layer and in durability, and experiences little transfer of a release layer component to a pressure-sensitive agent or the like.

The silicone adhesive film of the present invention is not restricted by the characteristic properties of silicone formed on the crosslinked primer layer and can be used for various applications thanks to the characteristic properties of the silicone.

The following examples are given to further illustrate the present invention. The value of each characteristic properties in the examples were measured in accordance with the following methods. "Parts" in the examples means "parts by weight".

1. Properties of Non-transfer to Back Surface

A polyester film having a release layer-formed surface was placed upon a polyester film not having a release layer-formed surface such that both the surfaces were faced to each other. A load of 6 kg/cm$^2$ was applied onto the films for 18 hours and then, a line was drawn on the release layer non-formed surface with a felt-tipped marker, and repellence to the marker ink was observed to evaluate the properties of non-transfer to back surface (simply referred to as "non-transfer properties" hereinafter) based on the following criteria.

⊚: No repellence was observed.
 . . . very excellent in non-transfer properties
Δ: Slight repellence was observed.
 . . . slightly inferior in non-transfer properties
×: Repellence was observed.
 . . . inferior in non-transfer properties 2. Releasability A 24 mm-wide cellophane tape was adhered to a release layer-formed surface of the polyester film by applying a pressure to it with a rubber roll, and a peel strength (peel resistance value: g/24 mm) required for peeling the cellophane tape from the release layer-formed surface at a peeling angle of 180° was measured using an Instron-type tensile tester to evaluate releasability of the polyester film based on the following criteria.

peel strength: less than 10 g/24 mm
   . . . good releasability
peel strength: not less than 10 g/24 mm
   . . . poor releasability 3. Silicone Adhesion
(A) Initial Adhesion A release layer surface of a release film obtained immediately after the formation of a release layer (immediately after application and drying) was rubbed by finger several times and the falling-off or adhesion state of the release layer was observed to evaluate initial adhesion based on the following criteria.

(B) Durable Adhesion

After a release film was maintained in an atmosphere of 60° C.×80% RH for one week, the surface of a release layer was rubbed by finger several times, and the falling-off or adhesion state of the release layer was observed to evaluate durable adhesion based on the following criteria.

[Criteria]

⊚: No change in release layer was observed
   . . . good adhesion
○: Slight whitening caused by peeling off of release layer was observed
   . . . somewhat good adhesion
Δ: Whitening caused by peeling off of release layer was observed in most portions
   . . . somewhat poor adhesion
×: Release layer was completely peeled off
   . . . poor adhesion

EXAMPLES 1 TO 7 AND COMPARATIVE EXAMPLES 1 TO 3

(1) Polyethylene terephthalate (containing 500 ppm of a lubricant) having an intrinsic viscosity, measured in orthochlorophenol at 35° C., of 0.65 dl/g was melt extruded onto a rotary cooling drum maintained at 20° C. to obtain a 950 μm-thick unstretched film. Thereafter, the unstretched film was stretched to 3.5 times in a longitudinal direction (machine direction) at 90° C. to obtain a monoaxially stretched film. An aqueous solution having a solids content of 4% by weight and a pH value of 6.3 and containing a silane coupling agent and nonionic surfactant (polyoxyethylene nonylphenyl ether) shown in Table 1 was applied to one surface of the monoaxially stretched film by a kiss-roll coating. Subsequently, the film was stretched to 3.9 times in a transverse direction at 105° C. and further heat-treated at 210° C. for 10 seconds to obtain a polyester film having a primer layer-coated layer of 75 μm in film thickness.

TABLE 1

| Pretreatment of monoaxially stretched film | Primer composition | | |
|---|---|---|---|
| | Silane coupling agent | | Surfactant |
| | (A) Kind (wt %) | (B) Kind (wt %) | (C) Kind (wt %) |
| Ex. 1 | No | A-1 (80) | B-1 (5) | C-1 (15) |
| Ex. 2 | No | A-1 (76) | B-1 (9) | C-1 (15) |
| Ex. 3 | No | A-1 (80) | B-2 (5) | C-1 (15) |
| Ex. 4 | No | A-2 (80) | B-1 (5) | C-1 (15) |
| Ex. 5 | No | A-2 (80) | B-2 (5) | C-1 (15) |
| Ex. 6 | No | A-1 (80) | B-1 (5) | C-2 (15) |
| Ex. 7 | Corona treatment | A-1 (94) | B-1 (6) | — (0) |

TABLE 1-continued

| Pretreatment of monoaxially stretched film | Primer composition | | |
|---|---|---|---|
| | Silane coupling agent | | Surfactant |
| | (A) Kind (wt %) | (B) Kind (wt %) | (C) Kind (wt %) |
| Comp. Ex. 1 | No | A-1 (85) | — (0) | C-1 (15) |
| Comp. Ex. 2 | No | — (0) | B-1 (85) | C-1 (15) |
| Comp. Ex. 3 | No | — (0) | — (0) | — (0) |

Ex.: Example
Comp. Ex.: Comparative Example

In Table 1, symbols for primer layer components indicate the following compounds.
A-1: γ-glycidoxypropyltrimethoxysilane
A-2: γ-glycidoxypropylmethyldiethoxysilane
B-1: N-β(aminoethyl)-γ-aminopropyltrimethoxysilane
B-2: N-β(aminoethyl)-γ-aminopropylmethyldimethoxysilane
C-1: surfactant having a structure represented by the following formula (III).

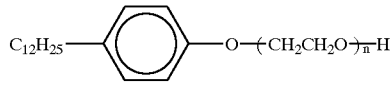

(n = 40)

C-2: surfactant having a structure represented by the following formula (IV).

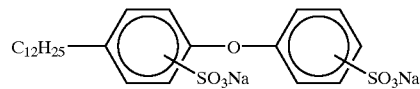

(2) Separately, a solution having a solids content of 5% was prepared by dissolving KS-772 (trade name) supplied by Shinetsu Chemical Co. Ltd. in toluene. (The KS-772 is a product of a type which is cured by adding a platinum catalyst to a mixture of polydimethylsiloxane and methylhydrogenpolysiloxane to cause an addition reaction.)

This solution was applied onto the primer layer of the above primer coated polyester films in a coating amount of 1 g/m², dried and cured at 150° C. for a residence time of 1 minute to form a release film. The evaluation results of this release film are shown in Table 2.

TABLE 2

| | Non-transfer properties | Releas-ability | Silicone adhesion | |
|---|---|---|---|---|
| | | | Initial adhesion | Durable adhesion |
| Ex. 1 | ⊚ | 6 | ⊚ | ⊚ |
| Ex. 2 | ⊚ | 5 | ⊚ | ⊚ |
| Ex. 3 | ⊚ | 6 | ⊚ | ⊚ |
| Ex. 4 | ⊚ | 7 | ⊚ | ⊚ |
| Ex. 5 | ⊚ | 8 | ⊚ | ⊚~○ |
| Ex. 6 | ⊚ | 8 | ⊚ | ⊚ |

TABLE 2-continued

|  | Non-transfer properties | Releas-ability | Silicone adhesion | |
| --- | --- | --- | --- | --- |
|  |  |  | Initial adhesion | Durable adhesion |
| Ex. 7 | ⊚ | 7 | ⊚ | ⊚ |
| Comp. Ex. 1 | ⊚ | 6 | ⊚ | Δ~○ |
| Comp. Ex. 2 | ⊚ | 6 | ⊚~○ | Δ~○ |
| Comp. Ex. 3 | x | 4 | x | x |

Ex.: Example, Comp. Ex.: Comparative Example

As is evident from the results of Table 2, release films using the silicone adhesive polyester film of the present invention are excellent in the properties of non-transfer to back surface, releasability, initial silicone adhesion and durable silicone adhesion.

What is claimed is:

1. A silicone adhesive film comprising:

(A) a biaxially oriented aromatic polyester film, and (B) a crosslinked primer layer which is present on at least one surface of the aromatic polyester film and is formed of a crosslinked polymer of (a) an alkoxysilane having a functional group selected from the group consisting of an epoxy group, a vinyl group and a mercaptoalkyl group and (b) an alkoxysilane having an amino group, wherein the alkoxysilane (a) and alkoxysilane (b) satisfy the following expression (1):

$$99.9/0.1 \leq a/b \leq 80/20 \tag{1}$$

wherein a and b are, respectively, parts by weight of alkoxysilane (a) and parts by weight of alkoxysilane (b) based on 100 parts by weight of the total of the alkoxysilane (a) and the alkoxysilane (b).

2. A release film comprising:

(A) a biaxially oriented aromatic polyester film, (B) a crosslinked primer layer present on at least one surface of the aromatic polyester film and composed of a crosslinked polymer of alkoxysilane having a functional group selected from the group consisting of an epoxy group, a vinyl group and a mercaptoalkyl group, and an alkoxysilane having an amino group, and (C) a silicone release layer present on the crosslinked primer layer, the thickness of the silicone release layer being 0.01 to 10 $\mu$m.

* * * * *